United States Patent
Chen et al.

(10) Patent No.: US 11,498,044 B2
(45) Date of Patent: Nov. 15, 2022

(54) BIO-SENSING AND TEMPERATURE-SENSING INTEGRATED CIRCUIT

(71) Applicant: TAIWAN SEMICONDUCTOR MANUFACTURING COMPANY, LTD., Hsinchu (TW)

(72) Inventors: Tung-Tsun Chen, Hsinchu (TW); Yi-Shao Liu, Zhubei (TW); Jui-Cheng Huang, Hsinchu (TW); Chin-Hua Wen, Toufen Township (TW); Felix Ying-Kit Tsui, Cupertino, CA (US); Yung-Chow Peng, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 259 days.

(21) Appl. No.: 16/685,185

(22) Filed: Nov. 15, 2019

(65) Prior Publication Data

US 2020/0094216 A1    Mar. 26, 2020

Related U.S. Application Data

(62) Division of application No. 15/866,051, filed on Jan. 9, 2018, now Pat. No. 10,478,797, which is a division of application No. 14/713,365, filed on May 15, 2015, now Pat. No. 9,873,100.

(60) Provisional application No. 62/051,622, filed on Sep. 17, 2014.

(51) Int. Cl.
*B01J 19/00*    (2006.01)

(52) U.S. Cl.
CPC .. *B01J 19/0046* (2013.01); *B01J 2219/00495* (2013.01); *B01J 2219/00585* (2013.01); *B01J 2219/00596* (2013.01); *B01J 2219/00716* (2013.01); *B01J 2219/00722* (2013.01)

(58) Field of Classification Search
CPC .......... B01J 19/0046; B01J 2219/00495; B01J 2219/00716; B01J 2219/00722
See application file for complete search history.

(56) References Cited

U.S. PATENT DOCUMENTS

| | | | |
|---|---|---|---|
| 6,150,102 A | 11/2000 | Mills, Jr. | |
| 8,821,798 B2 | 9/2014 | Bustillo et al. | |
| 9,310,332 B2 | 4/2016 | Chen et al. | |
| 9,873,100 B2 * | 1/2018 | Chen | B01J 19/0046 |
| 10,478,797 B2 * | 11/2019 | Chen | B01J 19/0046 |
| 2002/0081588 A1 * | 6/2002 | De Lumley-woodyear | B01J 19/0046 435/287.2 |
| 2002/0158645 A1 | 10/2002 | Chou et al. | |
| 2003/0008286 A1 | 1/2003 | Zou | |
| 2004/0238379 A1 | 12/2004 | Lindsay et al. | |
| 2006/0035400 A1 | 2/2006 | Wu et al. | |
| 2008/0280776 A1 | 11/2008 | Bashir et al. | |

(Continued)

*Primary Examiner* — Brian J. Sines
(74) *Attorney, Agent, or Firm* — Hauptman Ham, LLP

(57) ABSTRACT

An integrated circuit includes two or more rows of heating elements, two or more columns of heating elements, and a plurality of sensing circuits. Each sensing circuit is between two adjacent rows of the rows of heating elements and between two adjacent columns of the columns of heating elements, in a same silicon layer as the rows of heating elements and the columns of heating elements, and configured to generate a bio-sensing signal and a temperature-sensing signal.

20 Claims, 9 Drawing Sheets

(56) References Cited

U.S. PATENT DOCUMENTS

| | | |
|---|---|---|
| 2009/0253130 A1 | 10/2009 | Yoo |
| 2010/0229656 A1* | 9/2010 | Johnson .............. B01L 3/50273 |
| | | 73/863.11 |
| 2011/0208457 A1 | 8/2011 | Merz et al. |
| 2011/0263463 A1 | 10/2011 | Rothberg et al. |
| 2011/0267033 A1 | 11/2011 | Troccoli |
| 2012/0021918 A1 | 1/2012 | Bashir et al. |
| 2012/0265474 A1 | 10/2012 | Rearick et al. |
| 2012/0292255 A1* | 11/2012 | Nikoobakht ........... B82Y 15/00 |
| | | 324/692 |
| 2012/0320581 A1 | 12/2012 | Rogers |
| 2012/0326767 A1 | 12/2012 | Milgrew |
| 2013/0225441 A1 | 8/2013 | Hassibi |
| 2014/0235452 A1 | 8/2014 | Rothberg et al. |
| 2015/0129937 A1 | 5/2015 | Chen et al. |
| 2017/0225171 A1 | 8/2017 | Nazareth |

* cited by examiner

BIO-SENSING AND TEMPERATURE-SENSING INTEGRATED CIRCUIT

PRIORITY CLAIM

The present application is a divisional of U.S. application Ser. No. 15/866,051, filed Jan. 9, 2018, which is a divisional of U.S. application Ser. No. 14/713,365, filed May 15, 2015, now U.S. Pat. No. 9,873,100, issued Jan. 23, 2018, which claims the priority of U.S. Provisional Application No. 62/051,622, filed Sep. 17, 2014, which are incorporated herein by reference in their entireties.

RELATED APPLICATION

U.S. application Ser. No. 14/713,365 relates to U.S. patent application Ser. No. 14/079,703, filed Nov. 14, 2013, now U.S. Pat. No. 9,310,332, issued Apr. 12, 2016, the disclosure of which is incorporated herein by reference in its entirety.

BACKGROUND

Modern semiconductor technology is usable for forming bioelectrical devices that perform various types of bio-diagnosis. In some applications, some bio tests include controlling a diagnostic sample at one or more temperatures at different time period by different stages. For example, a molecular multiplication process, also known as polymerase chain reaction process or PCR process, includes heating a sample solution to different temperatures for separating deoxyribonucleic acid (DNA) strands in the sample solution and for synthesizing new DNA segments based on the separated DNA strains by a specific primer at a specific temperature.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
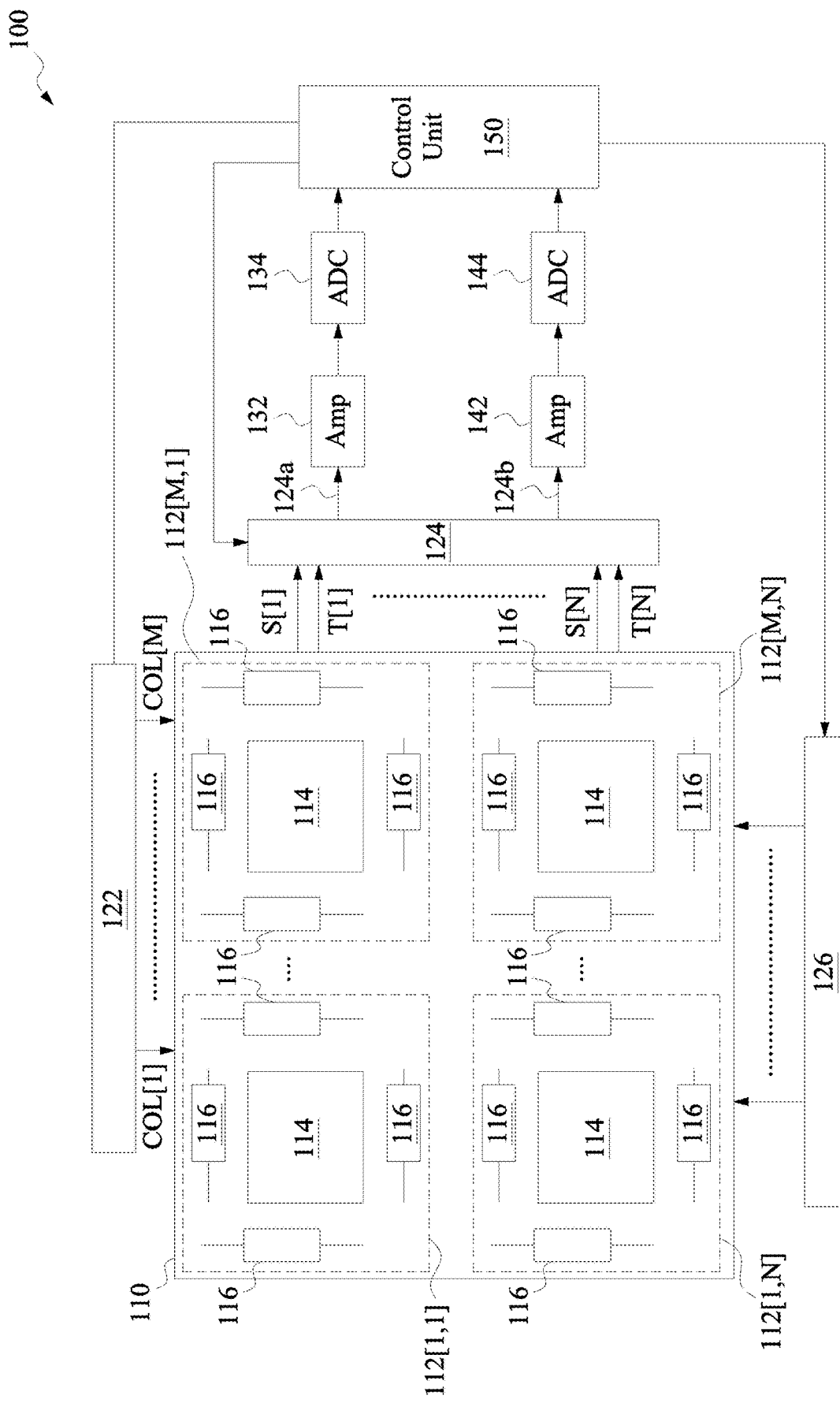
FIG. 1 is a functional block diagram of an integrated circuit in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, an integrated circuit suitable for performing various types of bio-diagnosis includes an array of sensing pixels. The array of sensing pixels includes a mesh of heating elements inserted therein, and each sensing pixel has a bio-sensing device and a temperature-sensing device. Moreover, in some embodiments, sensing pixels are separated by thermal isolation materials. As such, the temperature in the proximity of each bio-sensing device is capable of being locally and accurately monitored or controlled with rapid temperature response. In some embodiments, the array of sensing pixels is thus suitable to be configured to accommodate multiple PCR assays.

FIG. 1 is a functional block diagram of an integrated circuit 100 in accordance with some embodiments. Integrated circuit 100 includes an array of sensing pixels 110, which includes a plurality of sensing pixels 112[1,1], ..., 112[M,1], ..., 112[1,N], ..., 112[M,N] (collectively referred to as "sensing pixels 112") arranged into M columns and N rows. M and N are positive integers. In some embodiments, M ranges from 1 to 256. In some embodiments, N ranges from 1 to 256. Each sensing pixel of sensing pixels 112 of the array 110 includes a sensing circuit 114 and one or more heating elements 116. Details of the sensing circuits 114 and the heating elements 116 are further illustrated in conjunction with FIGS. 2A-6.

Integrated circuit 100 also includes a column decoder 122 coupled with the array of sensing pixels 110 along a column direction, a row decoder 124 coupled with the array of sensing pixels 110 along a row direction, a heater driver 126 coupled with a plurality of heating elements 116 of the array of sensing pixels 110. Moreover, integrated circuit 100 includes a first amplifier 132 and a first analog-to-digital converter (ADC) 134 configured to generate a first digital code based on the signal at a bio-sensing output of the row decoder 124. In some embodiments, bio-sensing output includes a signal representing a result of ion sensing or charge detection of bio-molecular interactions. Integrated circuit 100 also includes a second amplifier 142 and a second ADC 144 configured to generate a second digital code based on the signal at a temperature-sensing output of the row decoder 124. Integrated circuit 100 further includes a control unit 150 configured to control the column decoder 122, the row decoder 124, and the heater driver 126, and to receive the first digital code and the second digital code.

Column decoder 122 is coupled with sensing pixels 112 and is configured to generate a plurality of column selection signals COL[1] . . . COL[M]. In some embodiments, each column selection signal COL[1] or COL[M] is coupled with a corresponding column of sensing pixels 112.

Row decoder 124 is coupled with sensing pixels 112 through a plurality of signal paths S[1] . . . S[N] and T[1] . . . T[N]. In some embodiments, each signal path of S[1] to S[N] is configured to receive a signal from a selected bio-sensing device of a corresponding row of sensing pixels 112. In some embodiments, each signal path of T[1] to T[N] is configured to receive a signal from a selected temperature-sensing device of a corresponding row of sensing pixels 112. Row decoder 124 is also configured to generate signals at a bio-sensing output 124a and a temperature-sensing output 124b based on a selected row of sensing pixels 112.

Amplifier 132 is configured to receive and amplify the signal at output 124a to a voltage level suitable to be processed by ADC 134. In some embodiments, amplifier 132 is integrally formed within ADC 134. In some embodiments, amplifier 132 is omitted. In some embodiments, ADC 134 and control unit 150 are omitted. In some embodiments, one or more sets of the combination of an amplifier and an ADC similar to amplifier 132 and ADC 134 are added to process signals from signal paths S[1] to S[N] with amplifier 132 and ADC 134. In some embodiments, signal paths S[1] to S[N] are assigned to one of the different sets of amplifier/ADC in a hard-wired manner. In some embodiments, the load sharing among the different sets of amplifier/ADC is performed in a dynamic manner.

Amplifier 142 is configured to receive and amplify the signal at output 124b to a voltage level suitable to be processed by ADC 144. In some embodiments, amplifier 142 is integrally formed within ADC 144. In some embodiments, amplifier 142 is omitted. In some embodiments, ADC 134 and Control unit 150 are omitted. In some embodiments, one or more sets of the combination of an amplifier and an ADC similar to amplifier 142 and ADC 144 are added to process signals from signal paths T[1] to T[N] with amplifier 142 and ADC 144. In some embodiments, signal paths T[1] to T[N] are assigned to one of the different sets of amplifier/ADC in a hard-wired manner. In some embodiments, the load sharing among the different sets of amplifier/ADC is performed in a dynamic manner.

Figures 2A, 2B:
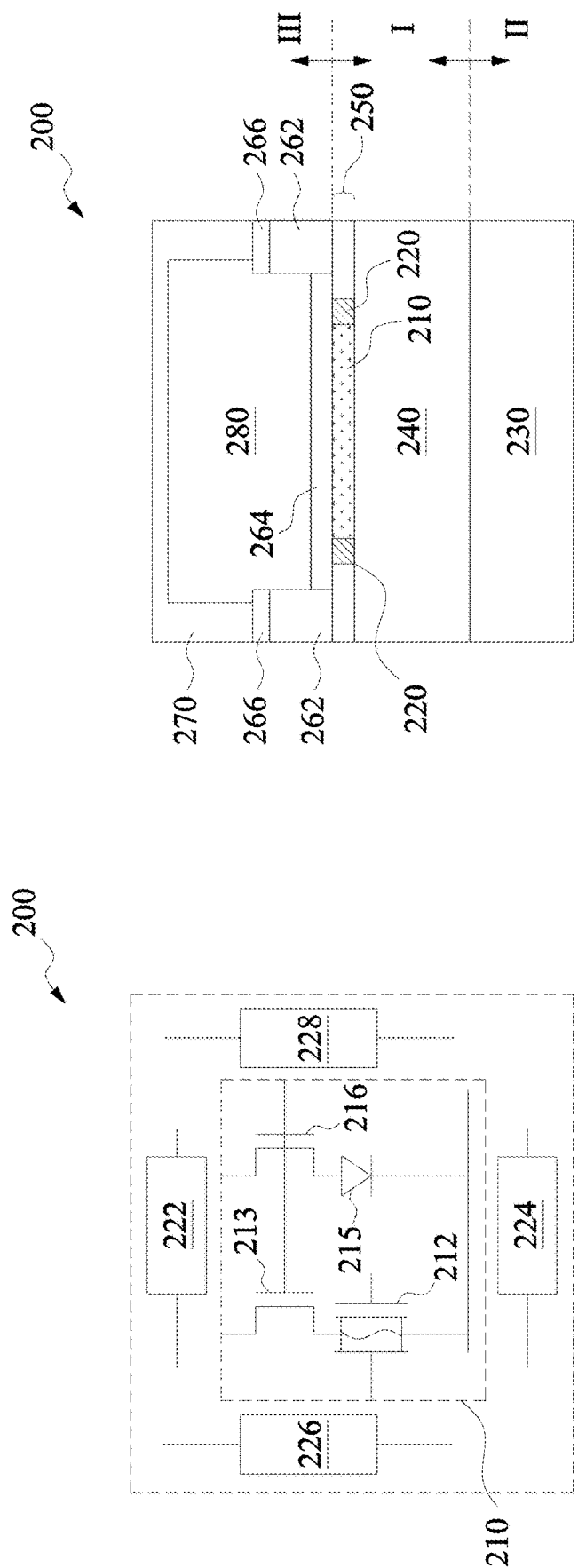
FIG. 2A is a circuit diagram of a sensing pixel of the integrated circuit in FIG. 1 in accordance with some embodiments.
FIG. 2B is a cross-sectional view of the sensing pixel of FIG. 2A in accordance with some embodiments.

FIG. 2A is a circuit diagram of a sensing pixel 200 of the integrated circuit 100 in FIG. 1 in accordance with some embodiments. In some embodiments, sensing pixel 200 is usable as any one of the sensing pixel 112 in FIG. 1.

Sensing pixel 200 includes a sensing circuit 210 and heating elements 222, 224, 226, and 228 (also collectively referred to as "heating elements 220") surrounding sensing circuit 210. Sensing circuit 210 includes a bio-sensing device 212, a first switching device 213, a temperature-sensing device 215, and a second switching device 216. First switching device 213 is coupled between a first end of bio-sensing device 212 and a corresponding signal path of the signal paths S[1] to S[N] (FIG. 1). Second switching device 216 is coupled between a first end of temperature-sensing device 215 and a corresponding signal path of the signal paths T[1] to T[N]. First switching device 213 and second switching device 216 are N-type transistors having gates coupled with a corresponding column selection signal COL[1] to COL[M]. A second end of bio-sensing device 212 and a second end of temperature-sensing device 215 are coupled together and configured to receive a reference voltage. In some embodiments, bio-sensing device 212 includes a nanowire or a field effect transistor. In some embodiments, temperature-sensing device 215 includes a diode. In some embodiments, first switching device 213 or second switching device 216 is implemented by other types of switching devices, such as a transmission gate or a P-type transistor.

Bio-sensing device 212 is configured to generate a bio-sensing signal responsive to an electrical characteristic of a sensing film 264 (FIG. 2B). Detail description of sensing film 264 will be further provided in conjunction with FIG. 2B. First switching device 213 is configured to selectively couple bio-sensing device 212 with bio-sensing output 124a (FIG. 1). Temperature-sensing device 215 is configured to generate a temperature-sensing signal responsive to a temperature of the sensing film 264. Second switching device 216 is configured to selectively couple temperature-sensing device 215 with temperature-sensing output 124b (FIG. 1). Heating elements 220 are configured to adjust the temperature of the sensing film 264.

FIG. 2B is a cross-sectional view of an implementation of the sensing pixel 200 having a circuit diagram depicted in FIG. 2A in accordance with some embodiments. Components that are the same or similar to those depicted in FIG. 2A are given the same reference numbers. Moreover, various structural components of sensing pixel 200 that are not shown in FIG. 2A because of the limitation of a circuit diagram are depicted in FIG. 2B.

Sensing pixel 200 includes a substrate 230, an interconnection structure 240 over substrate 230, a silicon layer 250 over interconnection structure 240, an isolation layer 262 over silicon layer 250, sensing films 264 and 266 over silicon layer 250, and a micro-conduit structure 270 over the sensing films 264 and 266 and isolation layer 262.

Compared with FIG. 2A, sensing circuit 210 of sensing pixel 200 is formed within silicon layer 250 under sensing films 264. Also, heating elements 220 are formed within silicon layer 250 surrounding sensing circuit 210. In some embodiments, signal and power paths of silicon layer 250 are electrically routed out of silicon layer 250 by the interconnection structure 240. In some embodiments, heating elements 220 are polysilicon resistors or doped semiconductor resistors. In some embodiments, heating elements 220 are metallic resistors formed within the interconnection structure 240.

In some embodiments, the fabrication of sensing pixel 200 is divided into three stages. In the first stage, portion I of sensing pixel 200, including interconnection structure 240 and silicon layer 250, is fabricated on a semiconductor substrate (not shown). In the second stage, the resulting semiconductor structure from the first stage is flipped and bounded onto portion II of sensing pixel 200, which includes substrate 230. In some embodiments, substrate 230 is also referred to as a handle substrate. In the third stage, the original substrate on which portion I is formed is removed and various components and structures corresponding to portion III of sensing pixel 200 are formed. In some embodiments, the original substrate is a silicon-on-isolation (SOI) substrate, and some or all of the isolation layer 262 is from the original SOI substrate. In some embodiments, the original substrate is a non-SOI substrate, and all components and structures corresponding to portion III of sensing pixel 200 are fabricated after the original substrate is removed.

In some embodiments, substrate 230 has a thickness ranging from 50 μm to 500 μm. In some embodiments, interconnection structure 240 has a thickness ranging from 0.5 µm to about 20 µm. In some embodiments, interconnection structure 240 has a dielectric material including silicon oxide ($SiO_2$), silicon nitride ($Si_3N_4$), or other suitable materials. In some embodiments, interconnection structure 240 has a thickness equal to or greater than 0.5 µm in order to accommodate at least one layer of conductive lines for signal routing. In some embodiments, a thicker interconnection structure 240 is usable to accommodate more layers of conductive lines for signal routing. However, in some embodiments, when interconnection structure 240 has a thickness greater than 20 µm, the flatness of the interconnection structure 240 becomes harder to be controlled within a predetermined tolerance during the fabrication process, which in turn reduces a yield rate of sensing pixel 200.

In some embodiments, silicon layer 250 has a thickness ranging from 0.05 µm to 3 µm. In some embodiments, electrical characteristics of various components formed in a thinner silicon layer 250 are easier to be controlled during the fabrication process than the counterparts in a thicker silicon layer 250. In some embodiments, when silicon layer 250 has a thickness greater than 3 µm, the process uniformity becomes harder to be controlled within a predetermined tolerance during the fabrication process. In some embodiments, when silicon layer 250 has a thickness less than 0.05 µm, silicon layer 250 becomes easier to be physically damaged by mechanical stresses thereon. In some embodiments, isolation layer 262 has a thickness ranging from 0.05 µm to 5 µm. In some embodiments, isolation layer 262 has a material including silicon oxide ($SiO_2$), silicon nitride ($Si_3N_4$), or other suitable materials. In some embodiments, when isolation layer 262 has a thickness greater than 5 µm, an aspect ratio for forming an opening (as a part of sensing region 280) becomes greater, which in turn reduces a yield rate of sensing pixel 200. In some embodiments, when isolation layer 262 has a thickness less than 0.05 µm, isolation layer 262 does not provide sufficient protection to the electrical components formed below isolation layer 262 from the chemicals in a sample solution to be sensed by sensing circuit 210.

Isolation layer 262 has an opening over sensing circuit 210. Sensing film 264 is formed in the opening over sensing circuit 210. Sensing film 266 is formed on the isolation layer 262. In some embodiments, sensing film 266 is removed or omitted while sensing film 264 remains in the opening over sensing circuit 210. In some embodiments, sensing film 264 has a material including hafnium oxide ($HfO_2$), $SiO_2$, tantalum pentoxide ($Ta_2O_5$), or other suitable materials. In some embodiments, sensing film 264 is formed by performing a native oxidation process on top of the silicon layer 250.

Micro-fluidic (or micro-conduit) structure 270 is formed over isolation layer 262. Micro-fluidic structure 270, sensing films 264 and 266, and isolation layer 262 form a sensing region 280 configured to receive a sample solution to be sensed by sensing circuit 210. In some embodiments, micro-conduit structure 270 has a material including $SiO_2$, silicon nitride ($Si_3N_4$), or other suitable materials. In some embodiments, micro-fluidic structure 270 is fabricated by bio-compatible material, such as polydimethylsiloxane (PDMS) or other types of polymer on another substrate (e.g., a glass-based substrate), and flip bonded with the other portions of the structure 200. In some embodiments, micro-fluidic structure 270 has a thickness ranging from 0.1 µm to 100 µm. In some embodiments, when micro-fluidic structure 270 has a thickness greater than 100 µm, an aspect ratio for forming an opening (as a part of sensing region 280) becomes greater, which in turn reduces a yield rate of sensing pixel 200. In some embodiments, when micro-fluidic structure 270 has a thickness less than 0.1 µm, a distance between a roof portion of micro-fluidic structure 270 directly over sensing region 280 becomes too close to sensing film 264 that the roof portion of micro-fluidic structure 270 would likely to bend closer to, or even touching, sensing film 264. As a result, the fluid resistance for injecting the sample solution into sensing region 280 becomes too large to allow a practical usage of sensing pixel 200. In some embodiments, sensing region 280 has a cubic volume ranging from 0.01 µm³ to 1000000 µm³.

In operation, an ion concentration of the sample solution to be sensed by sensing circuit 210 is placed over sensing film 264 and changes an electrical characteristic of sensing film 264, such as a surface potential and/or immobilized charges on the surface of sensing film 264. A bio-sensing device 212 (FIG. 2A) of sensing circuit 210 generates a bio-sensing signal responsive to the electrical characteristic of the sensing film 264. Moreover, temperature-sensing device 215 (FIG. 2A) generates a temperature-sensing signal responsive to a temperature of the sensing film 264. Also, heating elements 220 are configured to adjust the temperature of the sensing film 264, which in turn adjusts the temperature of the sampled solution in the sensing region 280.

Figure 3A:
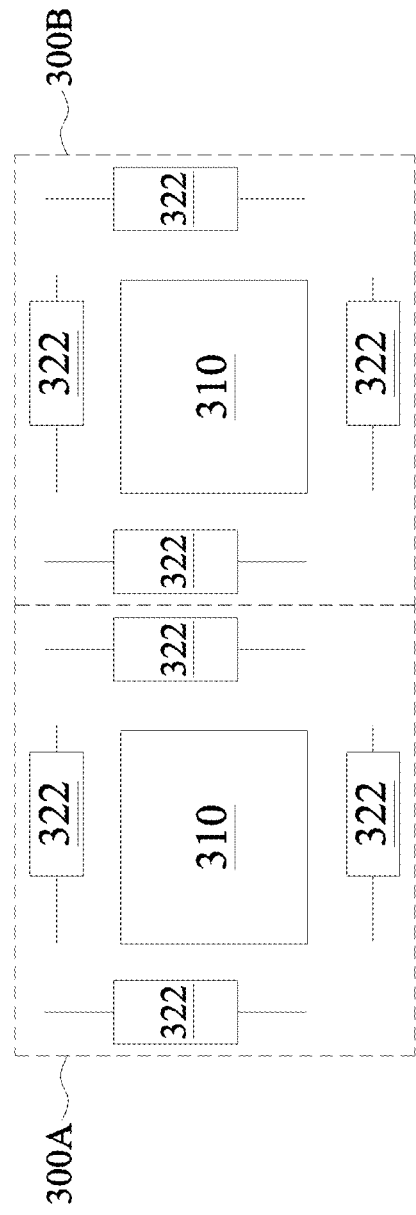
FIGS. 3A-3B are circuit diagrams of two adjacent sensing pixels usable in the integrated circuit in FIG. 1 in accordance with some embodiments.

FIG. 3A is a circuit diagram of two adjacent sensing pixels 300A and 300B usable in the integrated circuit in FIG. 1 in accordance with some embodiments. Sensing pixels 300A and 300B include corresponding sensing circuits 310 and heating elements 322. Sensing pixels 300A and 300B do not overlap with each other and do not share any of the heating elements 322.

Figure 3B:
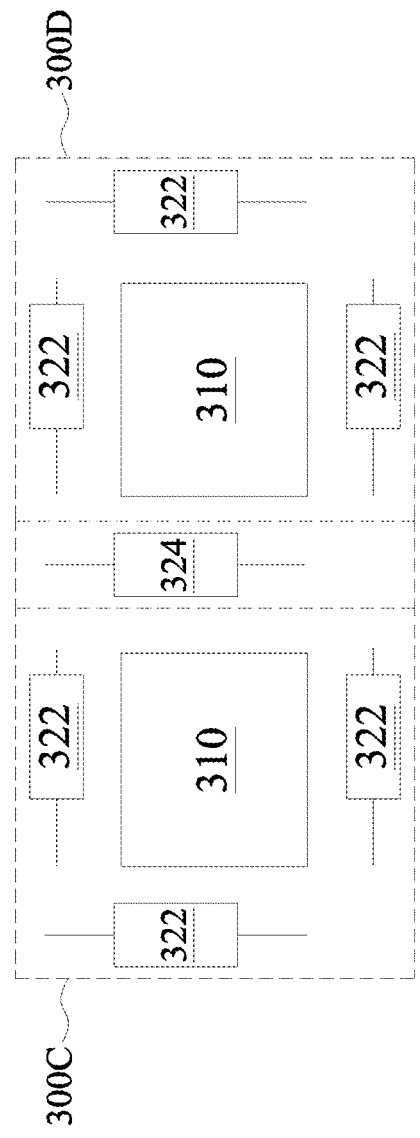

FIG. 3B is a circuit diagram of two adjacent sensing pixels 300C and 300D usable in the integrated circuit in FIG. 1 in accordance with some embodiments. Sensing pixels 300C and 300D include corresponding sensing circuits 310 and heating elements 322 and 324. Sensing pixels 300C and 300D overlap with each other and have a shared heating element 324.

Figure 4A:
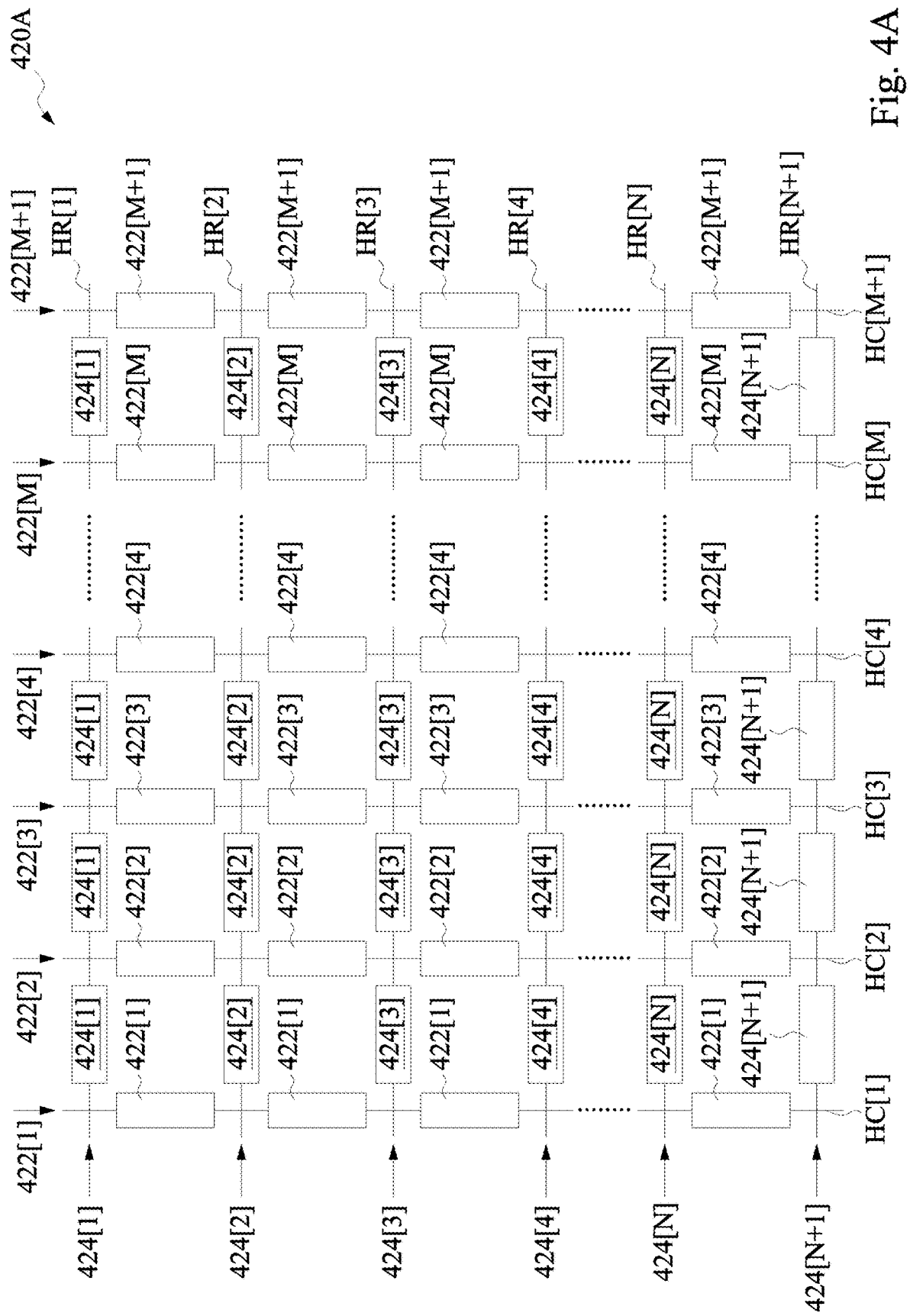
FIGS. 4A-4C are block diagrams of heating elements usable in the integrated circuit in FIG. 1 in accordance with some embodiments.

FIG. 4A is a block diagram of heating elements 420A usable in the integrated circuit in FIG. 1 in accordance with some embodiments. Heating elements 420A correspond to heating elements 116 in FIG. 1. Adjacent sensing pixels in FIG. 4A have an arrangement similar to adjacent sensing pixels depicted in FIG. 3B. Other details of sensing pixels 112 and the integrated circuit 100 are omitted.

Heating elements 420A includes M+1 columns of heating elements 422[1] to 422[M+1] for M columns of sensing circuits 114 (FIG. 1). Heating elements 420A also includes N+1 rows of heating elements 424[1] to 424[N+1] for N rows of sensing circuits 114. Each column of heating elements includes heating elements coupled in series and is coupled with heater driver 126 (FIG. 1) to receive corresponding column driving signals HC[1] to HC[M+1]. Each row of heating elements includes heating elements coupled in series and is also coupled with heater driver 126 to receive corresponding row driving signals HR[1] to HR[N+1]. In some embodiments, one or more columns of the plurality of columns of heating elements are controlled by a corresponding driving signal. For example, in some embodiments, the M+1 columns of heating elements 422[1] to 422[M+1] are divided into sub-groups of columns of heating elements, and every sub-group of columns, such as columns 422[1] and 422[2] for example, are controlled by the same driving signal, and thus the corresponding driving signals of each sub-group of columns, such as driving signals HC[1] and HC[2], refer to the same driving signal. In some embodiments, the N+1 rows of heating elements 424[1] to 424[N+

1] are divided into sub-groups of rows of heating elements, and every sub-group of rows, such as rows 424[1] and 424[2] for example, are controlled by the same driving signal, and thus the corresponding driving signals of each sub-group of rows, such as driving signals HR[1] and HR[2], refer to the same driving signal.

In some embodiments, each row and each column of the heating elements 420A are independently controlled through corresponding driving signals. In some embodiments, all columns of heating elements 422[1] to 422[M+1] are controlled by a common driving signal. In some embodiments, all rows of heating elements 424[1] to 424[N+1] are controlled by a common driving signal.

In some embodiments, heating elements 420A are capable of providing a uniform temperature distribution or a predetermined temperature distribution among the array 110. In some embodiments, the temperature of the array 110 (FIG. 1) is controlled in a closed-loop manner that the driving signals of heating elements 420A are generated based on the signals from temperature-sensing devices 215 of sensing pixels of the array 110. In some embodiments, the temperature of the array 110 (FIG. 1) is controlled in an open-loop manner that the driving signals of heating elements 420A are generated without referring to the signals from temperature-sensing devices 215 of sensing pixels of the array 110. In some embodiments, the control unit 150 (FIG. 1) controls the heating elements 420A through heater driver 126.

Figure 4B:
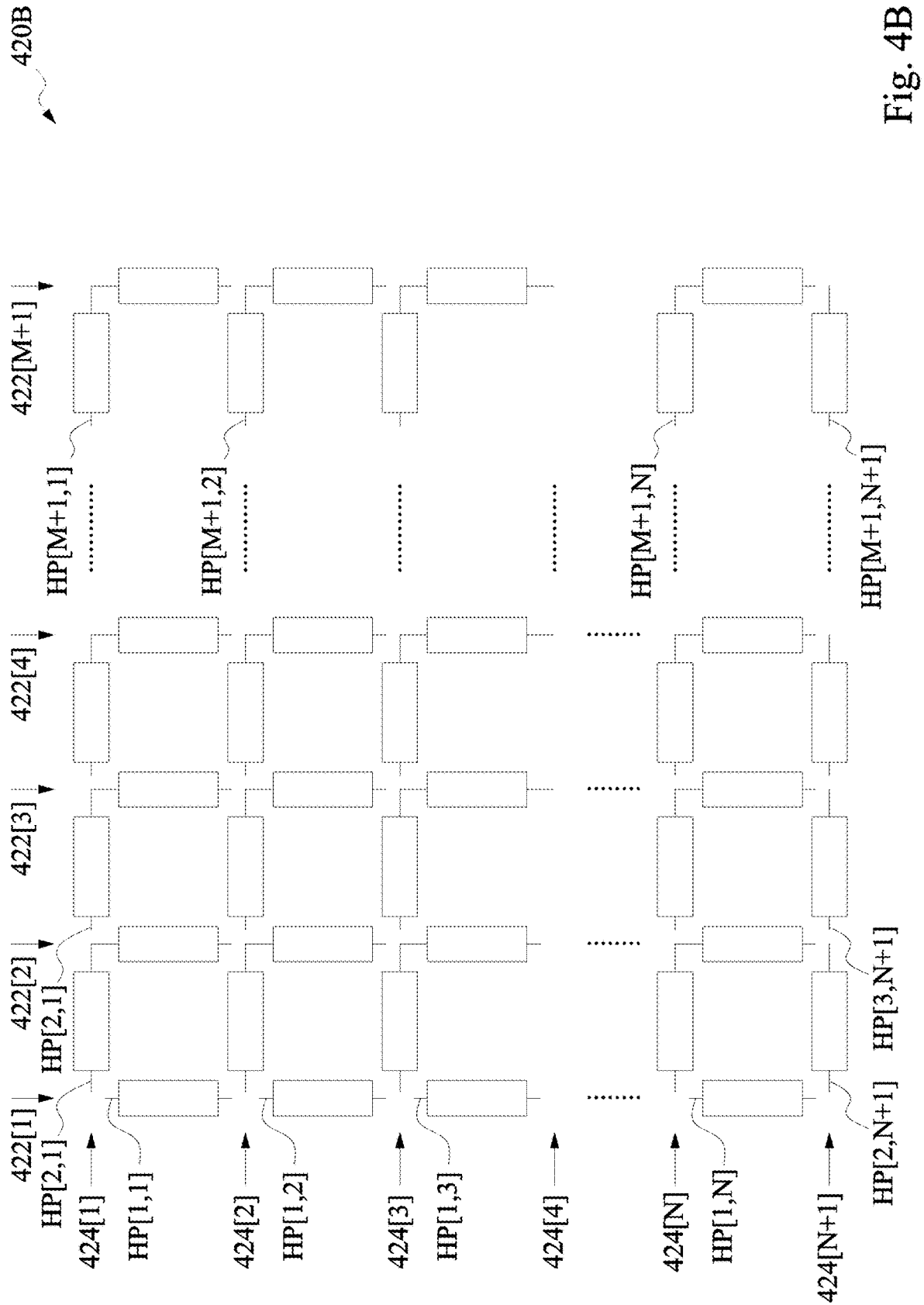

FIG. 4B is a block diagram of heating elements 420B usable in the integrated circuit in FIG. 1 in accordance with some embodiments. Heating elements 420B correspond to heating elements 116 in FIG. 1. Sensing pixels in FIG. 4B have an arrangement similar to sensing pixels depicted in FIG. 3B. Components in FIG. 4B that are the same or similar to those in FIG. 4A are given the same reference numbers. Other details of sensing pixels 112 and the integrated circuit 100 are omitted.

Heating elements 420B includes M+1 columns of heating elements 422[1] to 422[M+1] and N+1 rows of heating elements 424[1] to 424[N+1]. Each sensing area corresponding to a sensing pixel to accommodate a sensing circuit being between two adjacent rows of the rows of heating elements and being between two adjacent columns of the columns of heating elements. In other words, one sensing area is surrounded by two heating elements of the rows of heating elements and two heating elements of the columns of heating elements. In the embodiment depicted in FIG. 4B, a column heating element and a row heating element corresponding to two adjacent sides of a same sensing pixel are connected in series (depicted as having an "L" shape connection in FIG. 4B) and controlled by a driving signal. For example, one of heating elements from row 424[1] and one of heating elements from column 422[2] corresponding to a same sensing pixel are connected together and controlled by signal HP[2,1]. The column 422[1] of heating elements and the row 424[N+1] of heating elements are at the edge of the array 110 and are not grouped with any heating elements to form "L" shape units. In the embodiment depicted in FIG. 4B, each heating element in column 422[1] and row 424[N+1] is controlled by an individual control signal.

As such, heating elements 420B are divided into {(M+1)×(N+1)−1} groups of heating elements (M×N "L" shape units and M+N heating elements at the edge of the array) controlled by {(M+1)×(N+1)−1} driving signals HP[1,1] to HP[M+1,N+1] (skipping HP[1,N+1]). In some embodiments, one or more driving signals are further grouped as the same driving signal.

In some embodiments, heating elements 420B are capable of providing a uniform temperature distribution or a predetermined temperature distribution among the array 110. In some embodiments, the temperature of the array 110 (FIG. 1) is controlled in a closed-loop manner that the driving signals of heating elements 420B are generated based on the signals from temperature-sensing devices 215 of sensing pixels of the array 110. In some embodiments, the temperature of the array 110 (FIG. 1) is controlled in an open-loop manner that the driving signals of heating elements 420B are generated without referring to the signals from temperature-sensing devices 215 of sensing pixels of the array 110. In some embodiments, the control unit 150 (FIG. 1) controls the heating elements 420A through heater driver 126.

Figure 4C:
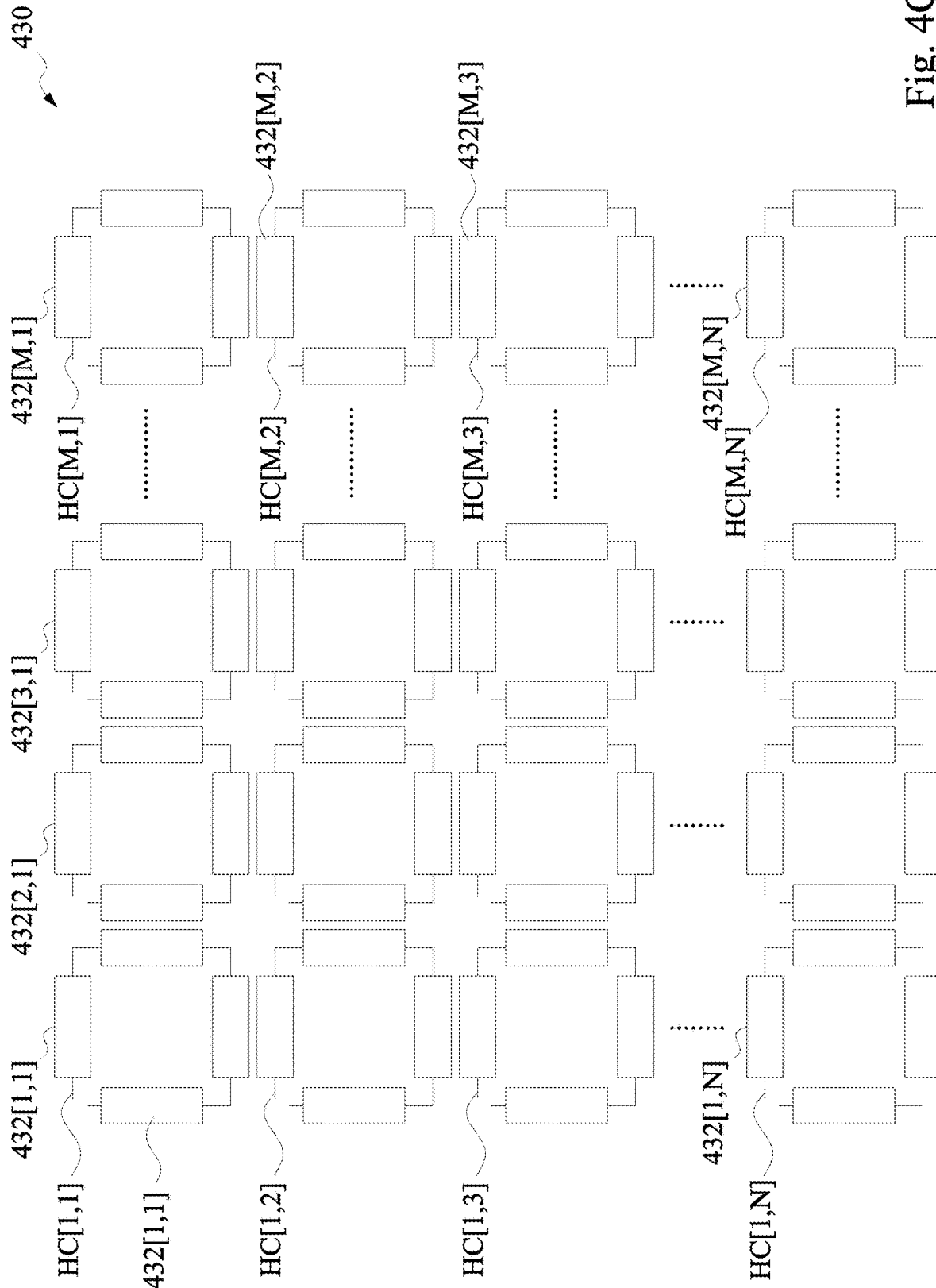

FIG. 4C is a block diagram of heating elements 430 usable in the integrated circuit in FIG. 1 in accordance with some embodiments. Heating elements 430 correspond to heating elements 116 in FIG. 1. Sensing pixels in FIG. 4C have an arrangement similar to sensing pixels depicted in FIG. 3A. Other details of sensing pixels 112 and the integrated circuit 100 are omitted.

Heating elements 430 includes groups of four serially-connected heating elements 423[1,1] to 432[M,N]. Each group of heating elements surrounding a corresponding sensing area. As such, heating elements 430 are divided into M×N groups of heating elements controlled by M×N driving signals HC[1,1] to HC[M,N]. In some embodiments, one or more driving signals are further grouped as the same driving signal. In some embodiments, the control unit 150 (FIG. 1) controls the heating elements 430 through heater driver 126 based on the signals from temperature-sensing devices of sensing pixels of the array 110 in a closed-loop manner as illustrated in conjunction with FIGS. 4A and 4B. In some embodiments, the control unit 150 controls the heating elements 430 through heater driver 126 in an open-loop manner as illustrated in conjunction with FIGS. 4A and 4B.

Figure 5A:
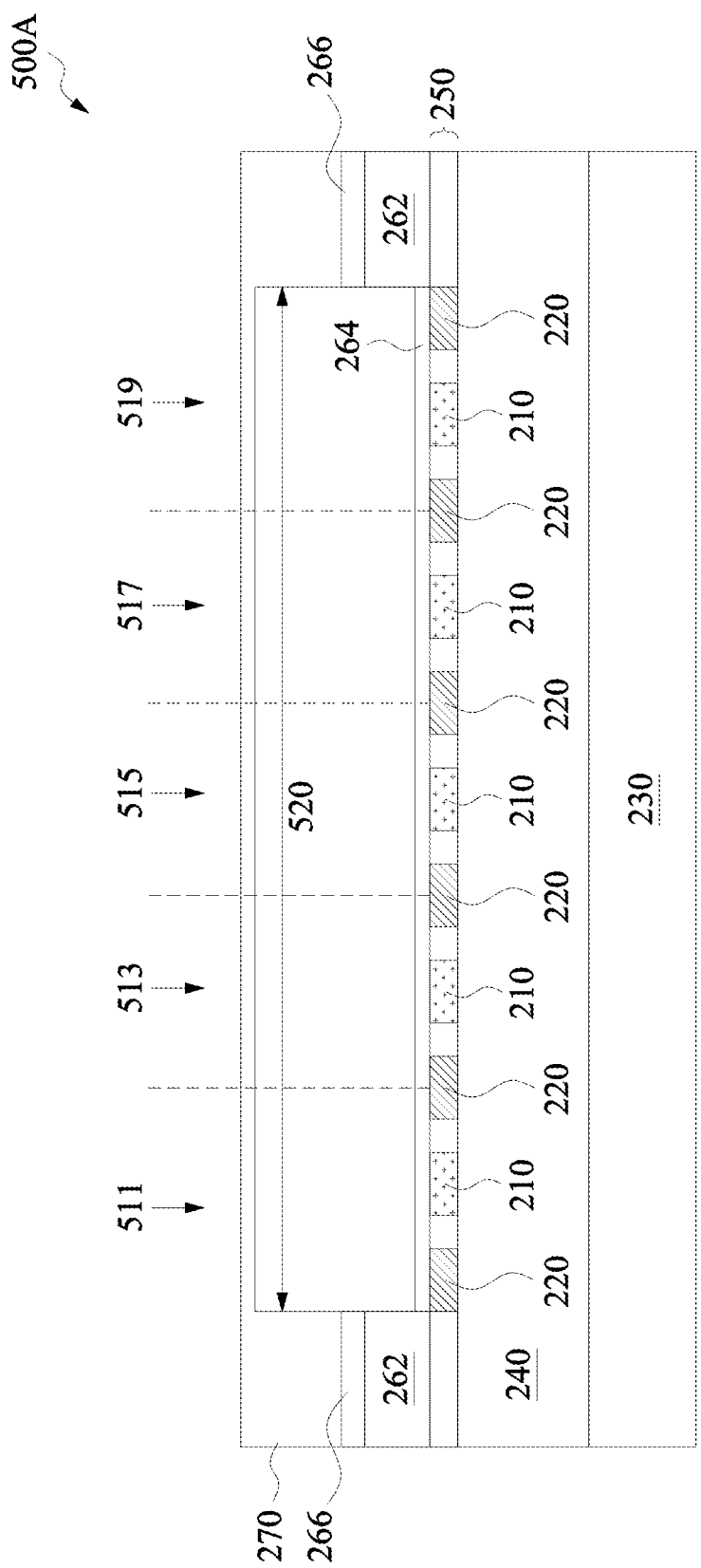
FIGS. 5A-5B are cross-sectional views of a portion of the integrated circuit in FIG. 1 in accordance with some embodiments.

FIG. 5A is a cross-sectional view of a portion of the integrated circuit 500A in accordance with some embodiments. Integrated circuit 500A corresponds to integrated circuit 100 in FIG. 1, and components in FIG. 5A that are the same or similar to those in FIG. 2B are given the same reference numbers.

Integrated circuit 500A includes a plurality of sensing pixels 511, 513, 515, 517, and 519 over substrate 230. Each sensing pixel of sensing pixels 511, 513, 515, 517, and 519 has a corresponding sensing circuit 210 surrounded by a corresponding heating element 220 as illustrated in conjunction with FIG. 2B. Micro-conduit structure 270 is formed over isolation layer 262. Micro-conduit structure 270, sensing films 264 and 266, and isolation layer 262 form a combined sensing region 520 configured to receive a sample solution to be sensed by sensing pixels 511, 513, 515, 517, and 519. Compared with sensing region 280, sensing region 520 exposes sensing film 264 corresponding to more than one sensing pixels 511, 513, 515, 517, and 519.

Only a row of five sensing pixels 511, 513, 515, 517, and 519 is depicted in FIG. 5A. In some embodiments, micro-conduit structure 270 and isolation layer 262 divide the array 110 in FIG. 1 into two or more sensing regions 280 or 520, where each region exposes sensing film portion(s) corresponding to a predetermined number of sensing pixels 112. For example, sensing region 280 in FIG. 2B is configured to expose the sensing film portion of one sensing pixel, and sensing region 520 in FIG. 5A is configured to expose the sensing film portions of five sensing pixels. As such, an integrated circuit 100 is capable of being used to form a testing device that has two or more sensing regions. In some embodiments, micro-conduit structure 270 and isolation layer 262 form a single sensing region based on the array 110, where the single sensing region exposes the sensing film portions corresponding to all or a predetermined number of sensing pixels 112.

Figure 5B:
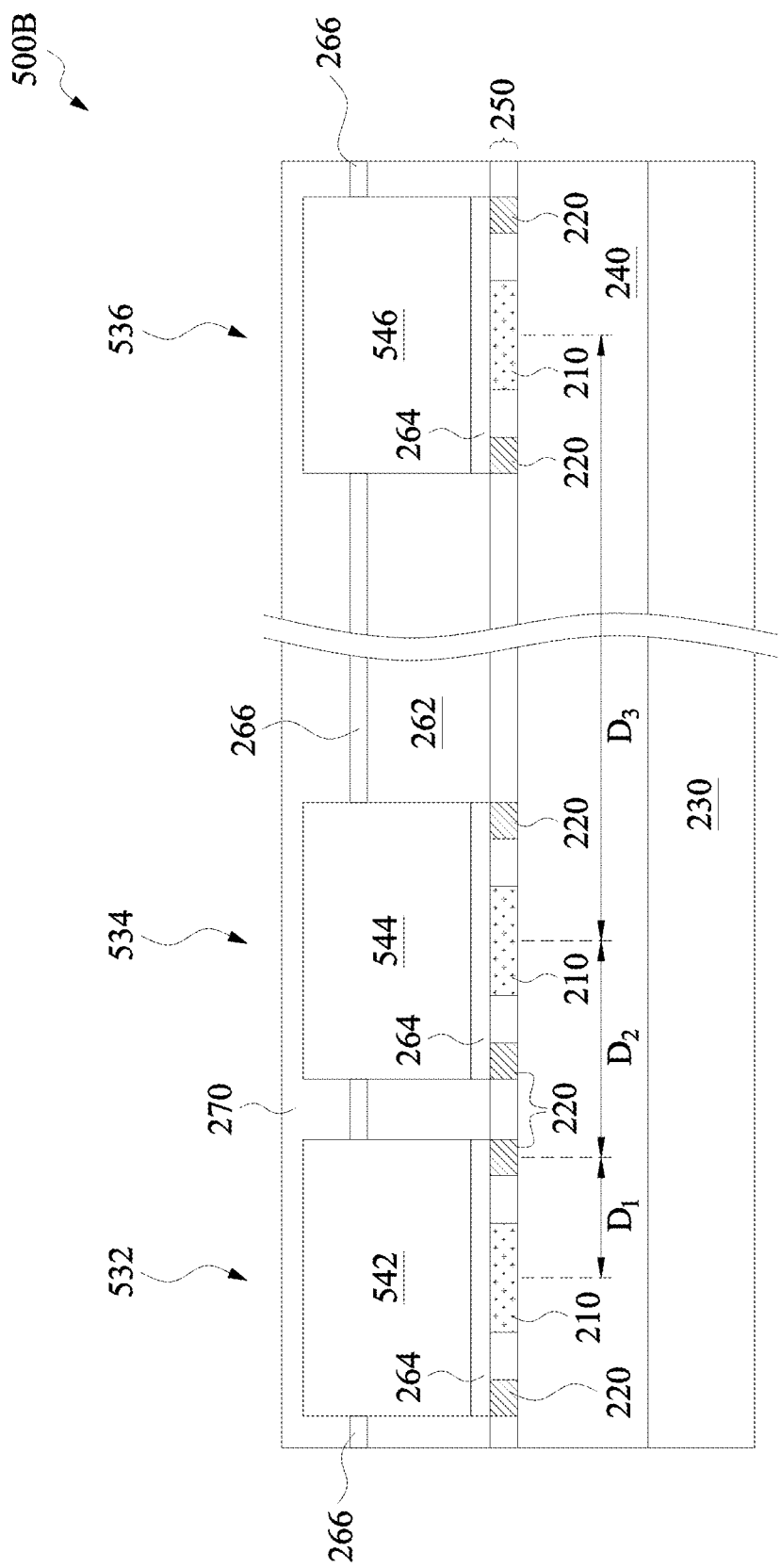

FIG. 5B is a cross-sectional view of a portion of the integrated circuit 500B in accordance with some embodiments. Integrated circuit 500B corresponds to integrated circuit 100 in FIG. 1. Components in FIG. 5B that are the same or similar to those in FIG. 5A and FIG. 2B are given the same reference numbers.

Integrated circuit 500B includes a plurality of sensing pixels 532, 534, and 536 over substrate 230. Each sensing pixel of sensing pixels 532, 534, and 536 has a corresponding sensing circuit 210 surrounded by a corresponding heating element 220 as illustrated in conjunction with FIG. 2B. Micro-conduit structure 270 is formed over isolation layer 262. Micro-conduit structure 270, sensing films 264 and 266, and isolation layer 262 form three corresponding sensing regions 542, 544, and 546 configured to receive three different sample solutions to be sensed by sensing circuits 210 of individual sensing pixels 532, 534, and 536.

In the embodiment depicted in FIG. 5B, a distance $D_1$ between the sensing circuit 210 of sensing pixel 532 and a heating element 220 of sensing pixel 532 is less than 5 μm. A distance $D_2$ between the sensing circuit 210 of sensing pixel 534 and the heating element 220 sensing pixel 532 is 20 μm. A distance $D_3$ between the sensing circuit 210 of sensing pixel 534 and the sensing circuit 210 of sensing pixel 536 is 400 μm.

In some bio applications using circuit 500B, a thermal time constant τ is governed by equation (1), where parameters ρ, Cp, and A are density, specific heat, and surface area of the sample solution. ΔT in (1) is temperature difference when the heating power is applied.

$$\tau = \frac{\rho c_p V \Delta T}{q'' A} \quad (1)$$

In some embodiments, distances $D_1$, $D_2$, and $D_3$ have values different form the example in the present disclosure. In some embodiments, distances $D_1$, $D_2$, and $D_3$ are set to render sensing pixels 532, 534, and 536 to have predetermined temperatures within a predetermined temperature accuracy.

Figure 6:
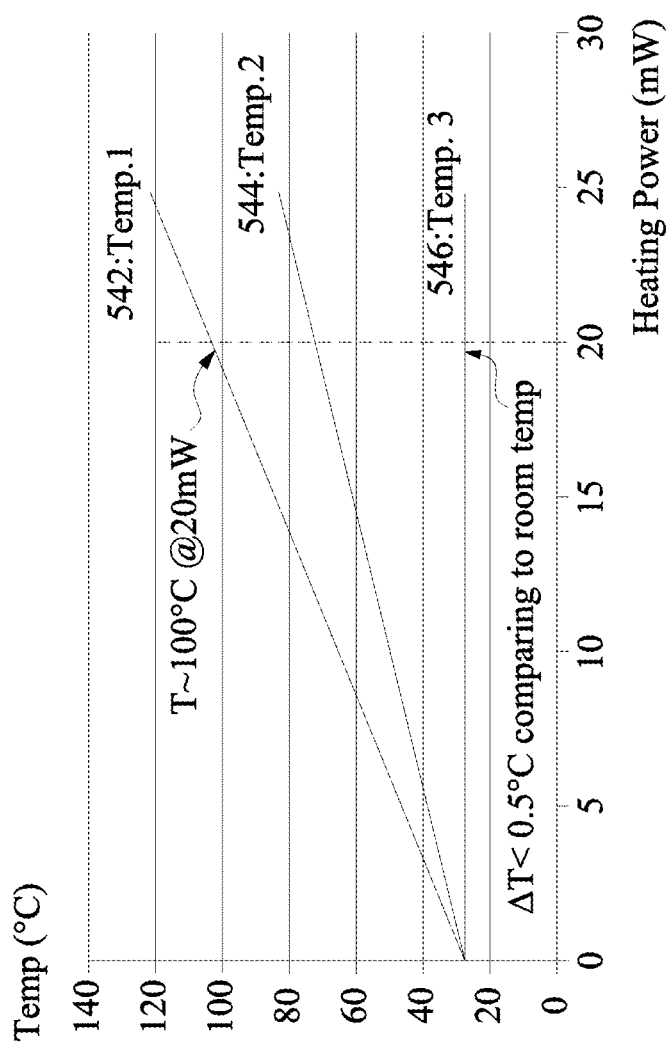
FIG. 6 is a chart of temperatures at various sensing pixels of integrated circuit in FIG. 5B in accordance with some embodiments.

FIG. 6 is a chart of temperatures at various sensing pixels of integrated circuit in FIG. 5B in accordance with some embodiments. In this embodiment, a temperature accuracy of 0.64° C. is attained by 2-point calibration from 25° C. to 100° C. Sensing region 542 is heated to 100° C. with 20 mW of power while keeping thermal coupling to sensing region 546 within 0.5%. Sensing region 544 has about 60% of the temperature increase of sensing region 542. The response time (including heating and cooling) achieved is about 0.35~350 msec/K, which depending on sample volume from several μL to sub-μL.

In some embodiments, an integrated circuit includes two or more rows of heating elements, two or more columns of heating elements, and a plurality of sensing circuits, each sensing circuit of the plurality of sensing circuits being between two adjacent rows of the rows of heating elements and between two adjacent columns of the columns of heating elements, in a same silicon layer as the rows of heating elements and the columns of heating elements, and configured to generate a bio-sensing signal and a temperature-sensing signal. In some embodiments, the integrated circuit includes a sensing film overlying the silicon layer, wherein each sensing circuit of the plurality of sensing circuits includes a sensing device configured to generate the bio-sensing signal responsive to an electrical characteristic of the sensing film. In some embodiments, the integrated circuit includes an isolation layer overlying the silicon layer, wherein the isolation layer divides the sensing film into two or more sensing film portions, each sensing film portion corresponding to a predetermined number of sensing circuits. In some embodiments, the integrated circuit includes a micro-fluidic structure overlying the isolation layer and the sensing film portions. In some embodiments, the integrated circuit includes an isolation layer overlying the silicon layer, and a micro-fluidic structure overlying the isolation layer and the sensing film, wherein the micro-fluidic structure, the isolation layer, and an entirety of the plurality of sensing circuits form a single sensing region. In some embodiments, the silicon layer overlies an interconnection structure, the interconnection structure including power paths configured to electrically route driving signals corresponding to the rows of heating elements and columns of heating elements, and signal paths configured to electrically route the bio-sensing signals and temperature-sensing signals generated by the plurality of sensing circuits. In some embodiments, the integrated circuit includes a heater driver coupled to the rows of heating elements and columns of heating elements through the power paths.

In some embodiments, an integrated circuit includes two or more rows of heating elements, two or more columns of heating elements, a plurality of sensing circuits, each sensing circuit of the plurality of sensing circuits being between two adjacent rows of the rows of heating elements and between two adjacent columns of the columns of heating elements, in a same silicon layer as the rows of heating elements and the columns of heating elements, and configured to generate a bio-sensing signal and a temperature-sensing signal. The integrated circuit includes an interconnection structure including a plurality of driving signal paths configured to route driving signals corresponding to the rows of heating elements and columns of heating elements, and a plurality of signal paths configured to route the bio-sensing and temperature-sensing signals generated by the plurality of sensing circuits. In some embodiments, the silicon layer and the interconnection structure are located on a first substrate. In some embodiments, the first substrate is attached to a second substrate. In some embodiments, each sensing circuit of the plurality of sensing circuits includes a bio-sensing device configured to generate the bio-sensing signal, a temperature-sensing device configured to generate the temperature-sensing signal, a first switching device configured to selectively couple a bio-sensing signal path of the plurality of signal paths to the bio-sensing device, and a second switching device configured to selectively couple a temperature-sensing signal path of the plurality of signal paths to the temperature-sensing device, wherein the sensing circuit is configured to selectively couple the bio-sensing and temperature-sensing signal paths of the plurality of signal paths to the respective bio-sensing and temperature-sensing devices simultaneously. In some embodiments, the plurality of sensing circuits are arranged in rows corresponding to the two adjacent rows of the rows of heating elements, each first switching device of a same row is coupled to a same bio-sensing signal path, and each second switching device of a same row is coupled to a same temperature-sensing signal path. In some embodiments, the plurality of sensing circuits are arranged in columns corresponding to the two adjacent columns of the columns of heating elements, the interconnection structure includes a plurality of column selection signal paths, and each first switching device and each second switching device of a same column includes a gate coupled to a same column selection signal path. In some embodiments, each first switching device and each second switching device includes an N-type transistor, a P-type transistor, or a transmission gate. In some embodiments, each heating element includes a polysilicon resistor or a doped semiconductor resistor.

In some embodiments, a method of fabricating an integrated circuit includes forming, in a same silicon layer of a first substrate, two or more rows of heating elements, two or more columns of heating elements, and a plurality of sensing areas, bonding the plurality of sensing areas to a second substrate, and removing the first substrate from the same silicon layer. Each sensing area of the plurality of sensing areas is between two adjacent rows of the rows of heating elements and between two adjacent columns of the columns of heating elements, and configured to generate a bio-sensing signal and a temperature-sensing signal. In some embodiments, the method includes forming an interconnection structure on the first substrate and adjacent to the same silicon layer. In some embodiments, the method includes forming a plurality of sensing film portions on a surface of the same silicon layer opposite the second substrate. In some embodiments, forming the plurality of sensing film portions includes forming at least one sensing film portion of the plurality of sensing film portions on more than one sensing area of the plurality of sensing areas. In some embodiments, the first substrate includes an isolation layer, and forming the plurality of sensing film portions includes forming each sensing film portion of the plurality of sensing film portions in an opening of the isolation layer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit comprising:
   two or more rows of heating elements extending in a first direction in a silicon layer;
   two or more columns of heating elements extending in a second direction perpendicular to the first direction in the silicon layer; and
   a plurality of sensing circuits, each sensing circuit of the plurality of sensing circuits being
      between two adjacent rows of the rows of heating elements and between two adjacent columns of the columns of heating elements,
      in the same silicon layer as the rows of heating elements and the columns of heating elements, thereby being surrounded by four heating elements, and
      configured to generate a bio-sensing signal and a temperature-sensing signal.

2. The integrated circuit of claim 1, further comprising a sensing film overlying the silicon layer, wherein each sensing circuit of the plurality of sensing circuits comprises a sensing device configured to generate the bio-sensing signal responsive to an electrical characteristic of the sensing film.

3. The integrated circuit of claim 2, further comprising an isolation layer overlying the silicon layer, wherein the isolation layer divides the sensing film into two or more sensing film portions, each sensing film portion corresponding to a predetermined number of sensing circuits.

4. The integrated circuit of claim 3, further comprising a micro-fluidic structure overlying the isolation layer and the sensing film portions.

5. The integrated circuit of claim 2, further comprising:
   an isolation layer overlying the silicon layer; and
   a micro-fluidic structure overlying the isolation layer and the sensing film, wherein the micro-fluidic structure, the isolation layer, and an entirety of the plurality of sensing circuits form a single sensing region.

6. The integrated circuit of claim 1, wherein the silicon layer overlies an interconnection structure, the interconnection structure comprising:
   power paths configured to electrically route driving signals corresponding to the rows of heating elements and columns of heating elements; and
   signal paths configured to electrically route the bio-sensing signals and temperature-sensing signals generated by the plurality of sensing circuits.

7. The integrated circuit of claim 6, further comprising a heater driver coupled to the rows of heating elements and columns of heating elements through the power paths.

8. An integrated circuit comprising:
   two or more rows of heating elements extending in a first direction in a silicon layer;
   two or more columns of heating elements extending in a second direction perpendicular to the first direction in the silicon layer;
   a plurality of sensing circuits, each sensing circuit of the plurality of sensing circuits being
      between two adjacent rows of the rows of heating elements and between two adjacent columns of the columns of heating elements,
      in the same silicon layer as the rows of heating elements and the columns of heating elements, thereby being surrounded by four heating elements, and
      configured to generate a bio-sensing signal and a temperature-sensing signal; and
   an interconnection structure comprising:
      a plurality of driving signal paths configured to route driving signals corresponding to the rows of heating elements and columns of heating elements; and
      a plurality of signal paths configured to route the bio-sensing and temperature-sensing signals generated by the plurality of sensing circuits.

9. The integrated circuit of claim 8, wherein the silicon layer and the interconnection structure are located on a first substrate.

10. The integrated circuit of claim 9, wherein the first substrate is attached to a second substrate.

11. The integrated circuit of claim 8, wherein each sensing circuit of the plurality of sensing circuits comprises:
   a bio-sensing device configured to generate the bio-sensing signal;
   a temperature-sensing device configured to generate the temperature-sensing signal;
   a first switching device configured to selectively couple a bio-sensing signal path of the plurality of signal paths to the bio-sensing device; and a second switching device configured to selectively couple a temperature-sensing signal path of the plurality of signal paths to the temperature-sensing device, wherein the sensing circuit is configured to selectively couple the bio-sensing and temperature-sensing signal paths of the plurality of signal paths to the respective bio-sensing and temperature-sensing devices simultaneously.

12. The integrated circuit of claim 11, wherein the plurality of sensing circuits are arranged in rows corresponding to the two adjacent rows of the rows of heating elements, each first switching device of a same row is coupled to a same bio-sensing signal path, and each second switching device of a same row is coupled to a same temperature-sensing signal path.

13. The integrated circuit of claim 11, wherein the plurality of sensing circuits are arranged in columns corresponding to the two adjacent columns of the columns of heating elements, the interconnection structure comprises a plurality of column selection signal paths, and each first switching device and each second switching device of a same column comprises a gate coupled to a same column selection signal path.

14. The integrated circuit of claim 11, wherein each first switching device and each second switching device comprises an N-type transistor, a P-type transistor, or a transmission gate.

15. The integrated circuit of claim 8, wherein each heating element comprises a polysilicon resistor or a doped semiconductor resistor.

16. A method of fabricating an integrated circuit, the method comprising:

forming, in a same silicon layer of a first substrate, two or more rows of heating elements extending in a first direction, two or more columns of heating elements extending in a second direction perpendicular to the first direction, and a plurality of sensing areas;

bonding the plurality of sensing areas to a second substrate; and removing the first substrate from the same silicon layer, wherein each sensing area of the plurality of sensing areas is between two adjacent rows of the rows of heating elements and between two adjacent columns of the columns of heating elements, thereby being surrounded by four heating elements, and configured to generate a bio-sensing signal and a temperature-sensing signal.

17. The method of claim 16, further comprising forming an interconnection structure on the first substrate and adjacent to the same silicon layer.

18. The method of claim 16, further comprising forming a plurality of sensing film portions on a surface of the same silicon layer opposite the second substrate.

19. The method of claim 18, wherein the forming the plurality of sensing film portions comprises forming at least one sensing film portion of the plurality of sensing film portions on more than one sensing area of the plurality of sensing areas.

20. The method of claim 18, wherein the first substrate comprises an isolation layer, and the forming the plurality of sensing film portions comprises forming each sensing film portion of the plurality of sensing film portions in an opening of the isolation layer.

* * * * *